United States Patent [19]

Faupel et al.

[11] Patent Number: 4,590,913
[45] Date of Patent: May 27, 1986

[54] FUEL INJECTION PUMP

[75] Inventors: Werner Faupel, Gerlingen; Gerald Höfer, Weissach-Flacht, both of Fed. Rep. of Germany

[73] Assignee: Robert Bosch GmbH, Stuttgart, Fed. Rep. of Germany

[21] Appl. No.: 740,169

[22] Filed: Jun. 3, 1985

[30] Foreign Application Priority Data

Jun. 22, 1984 [DE] Fed. Rep. of Germany ....... 3423212

[51] Int. Cl.$^4$ ............................................. F02M 59/20
[52] U.S. Cl. ..................................... 123/502; 123/387
[58] Field of Search ............... 123/502, 501, 357, 387; 417/462

[56] References Cited

U.S. PATENT DOCUMENTS

| | | | |
|---|---|---|---|
| 4,224,916 | 9/1980 | Davis | 123/502 |
| 4,365,605 | 12/1982 | Wessel et al. | 123/502 |
| 4,397,285 | 8/1983 | O'Neill | 123/502 |
| 4,432,327 | 2/1984 | Salzgeber | 123/502 |
| 4,475,519 | 10/1984 | Eheim et al. | 123/502 |
| 4,495,916 | 1/1985 | Shinoda | 123/502 |

FOREIGN PATENT DOCUMENTS 91335  5/1983  Japan .................................. 123/502

Primary Examiner—Magdalen Y. C. Moy
Attorney, Agent, or Firm—Edwin E. Greigg

[57] ABSTRACT

A fuel injection pump having a hydraulic injection onset adjuster, an rpm governor with at least one member operating in accordance with load, and a full-load stop of the governor which limits the maximum injection quantity is proposed, in which between the full-load stop and the governor member adjustable in accordance with load a switch is provided, which switch upon a change from full load to partial load triggers a magnetic valve, to thereby effect a shift of the injection onset toward "late". The magnetic valve, to this end, engages the hydraulic control of the injection adjuster.

11 Claims, 3 Drawing Figures

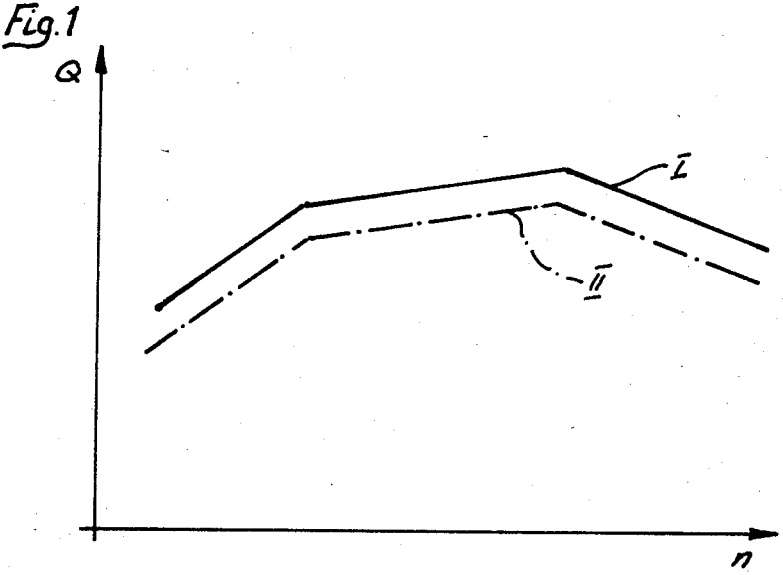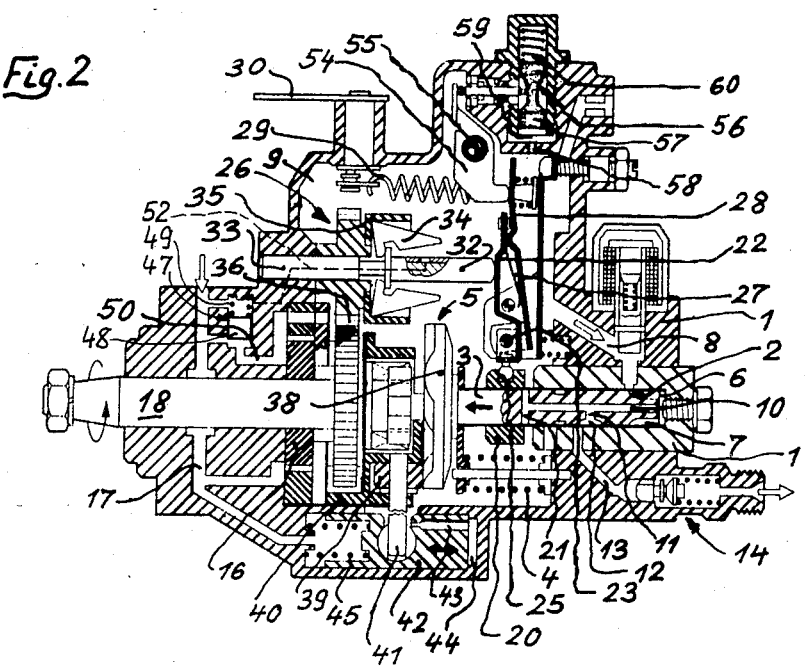

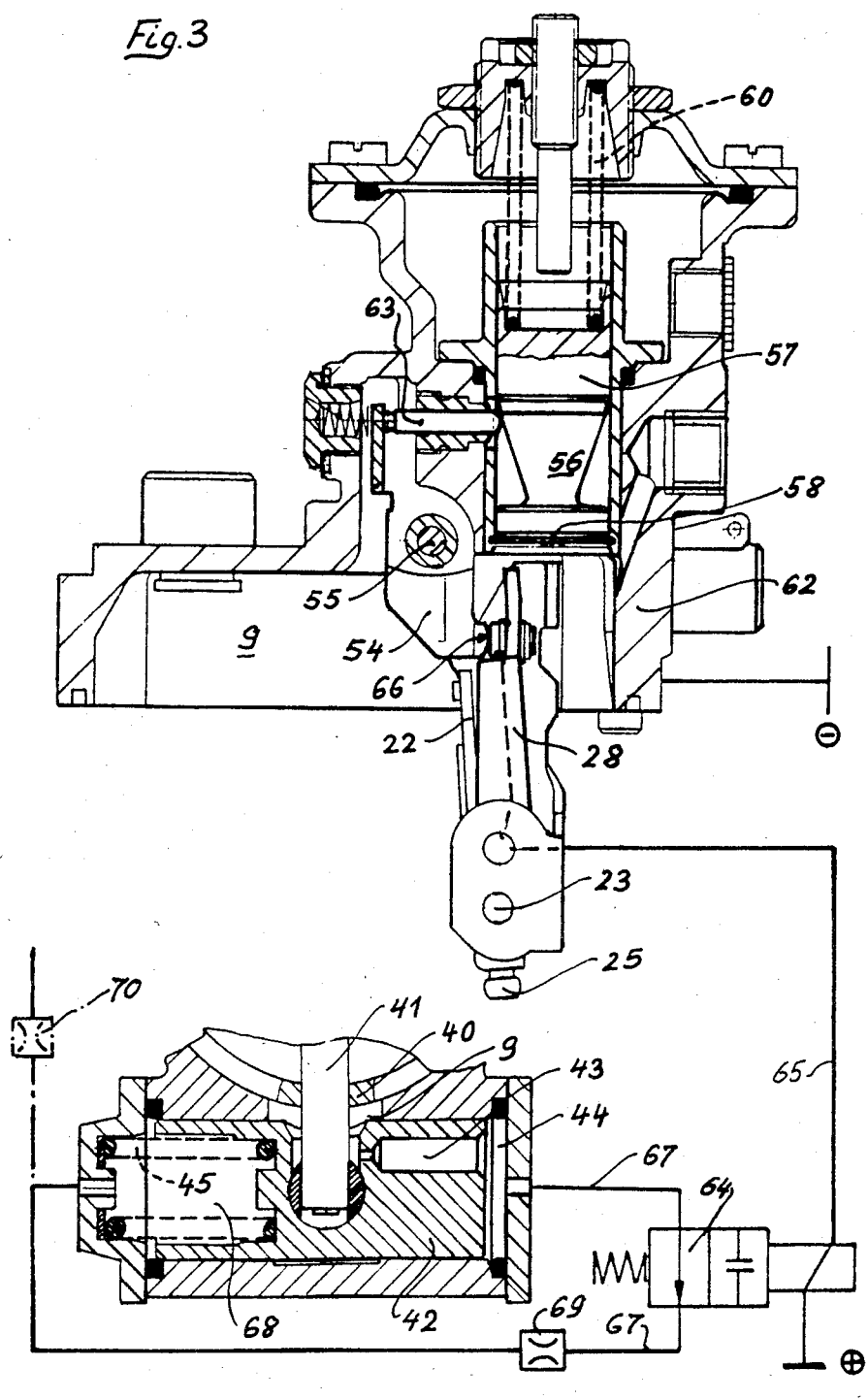

FUEL INJECTION PUMP

BACKGROUND OF THE INVENTION

The invention is based on a fuel injection pump as defined hereinafter.

In Diesel engines, the actual fuel consumption per stroke is known to vary with the rpm. While the supply quantity per stroke of the injection pump increases with increasing rpm, the characteristic curve for the quantity required by the engine drops beyond a predetermined rpm. Therefore the injection quantity at full load must be adapted to what is needed. Injecting too much fuel means that smoke will develop or that the Diesel engine will overheat. Aside from this, the fuel consumption is reduced and the torque characteristic is improved by means of this adaptation.

In known fuel injection pumps of this type (Bosch distributor injection pump, type VE) this full-load adaptation is therefore usually effected by means of the pressure valve on the high-pressure side of the pump and/or by means of an expanded governor lever assembly. A full-load regulation using the governor lever assembly is performed whenever the pressure valves are no longer sufficient for the adaptation, or whenever special, additional characteristics are to be taken into consideration in the adjustment, such as the charge pressure of a turbocharger or the atmospheric pressure.

In addition to the full-load quantity, the supply onset must also be corrected in accordance with load. The load-dependent supply onset is designed such that with decreasing load, for instance decreasing from full load to partial load (retraction of the gas pedal), a shift toward "late" is made. With increasing load, a decrease in the rpm occurs, and the load-dependent supply onset shifts the instant of injection toward "late". Smoother engine operation as well as noise abatement is hereby attained. In a known fuel injection pump of the type mentioned at the outset above i.e., (German Offenlegungsschrift No. 21 58 689), the rpm governor operates with a governor sleeve, which is engaged by the flyweights and which controls a valve by means of which the progression of the supply pump pressure, which increases with increasing rpm, is decreased beyond a predetermined rpm, thereby effecting a shift of the injection adjusting piston and hence of the onset of injection toward "late". Since a specific set-point rpm or a specific load status for which the governor adjusts the required injection quantity, for instance by shifting the governor sleeve, is predetermined by the adjusting lever, this valve effects a load-dependent variation of the supply pump pressure and thus of the injection onset.

In another known fuel injection pump (German Offenlegungsschrift No. 19 12 919), a full-load stop is attained by means of a piston acted upon by the supply pump pressure varying in accordance with rpm, on the jacket face of which is a curve which is picked up by a bell crank, one arm of which serves as the full-load stop of the governor lever of the rpm governor. Any fluctuations in the supply pump pressure simultaneously cause a variation or fluctuation in the adjustment, which in turn causes poorer engine operation.

According to a further development (German Offenlegungsschrift No. 31 21 107) of this known fuel injection pump, a throttle is provided in the inflow conduit to the work chamber of the piston, and a magnetic valve is provided in an outflow conduit of this work chamber; the magnetic valve is triggered in accordance with engine load and rpm by means of an electronic control unit. The required transducer values are picked up from governor elements that are adjustable in accordance with load.

Direct injection engines react to load changes from full to partial load particularly sensitively in terms of a belated correction of the injection onset toward "late". If the injection adjustment lags behind the load change, as in all known fuel injection pumps, this causes worsening consumption, noise and emissions. In vehicle engines, such changes from full load to partial loads are made continually, whenever the gas pedal is retracted.

OBJECT AND SUMMARY OF THE INVENTION

The fuel injection pump according to the invention has the advantage over the prior art that in load changes from full load to partial load a correction of the injection timing toward "late" is effected which is independent of the rpm until such time as the rpm governor member which is adjustable in accordance with load again rests on the full-load stop. As a result, the load change, not the rpm, is used as the signal for adjusting the injection toward "late". Because existing elements, such as the rpm governor member which is adjustable in accordance with load and the adjustable full-load stop are used as switch elements, expensive electric or electronic control units can be dispensed with. The rpm governor may be either a hydraulic or a mechanical governor, because every governor has a member that is adjustable in accordance with load. The full-load stop effecting the regulation of the quantity is also present in almost every governor, so that the invention can be realized in almost every fuel injection pump without substantial structural alterations.

According to an advantageous embodiment of the invention, the governor stop for the full-load quantity is hydraulically adjustable when there is a load change; as described above, the rpm governor may have a control member with which the hydraulic pressure upstream of the adjusting piston is variable in accordance with load, this variable pressure being arranged to determine the position of the full-load stop. As a result, the already existing pressure of the supply pump, which is variable in accordance with load, can be used to adjust the full-load stop.

According to a further feature of the invention, the switch is embodied directly by the contacting surfaces of the stop and the quantity member. To this end, all that needs to be done is to insulate the stop face.

In accordance with the invention, the magnetic valve can control the pressure either on the work chamber side of the adjusting piston or on the side engaged by the restoring force. This can be accomplished by the flow of control fluid either out of this work chamber or into the restoring chamber.

The invention will be better understood and further objects and adantages thereof will become more apparent from the ensuing detailed description of a preferred embodiment taken in conjunction with the drawing.

BRIEF DESCRIPTION OF THE DRAWING

FIG. 1 is a function diagram having supply quantity requirement curves at full load and at partial load;

FIG. 2 is a cross-sectional view of a simplified illustration of a distributor-type fule injection pump having a hydraulic injection adjuster, in longitudinal section; and FIG. 3 shows partially in cross-section details of FIG. 1 pertaining to the exemplary embodiment of the invention, on a larger scale.

DESCRIPTION OF THE PREFERRED EMBODIMENT

In the diagram shown in FIG. 1, the supply quantity Q is plotted on the ordinate, and the rpm is plotted on the abscissa. The curves I and II shown indicate the respective course of the quantity supplied by the injection pump. The upper curve I, drawn as a solid line, is the full-load curve, that is, the curve of the injection quantity adapted to the full-load requirement of the internal combustion engine. The lower curve II, shown in dot-dash lines, is the partial-load curve, also corresponding to the injection quantity which the engine is capable of combusting at partial load above the rpm without forming soot.

While at full load the instant of injection onset must be increasingly shifted toward "early" as the rpm increases, partial load requires a somewhat later injection onset than does full load, although in principle the injection onset must also be shifted toward "early" in the case of partial load with increasing rpm. When there is a change from full load to partial load, the injection onset must accordingly be adjusted as rapidly as possible toward "later", regardless of the rpm. Thus the rpm cannot serve as the characteristic variable for a rapid change; instead, the load change itself, which is fed as a characteristic variable to every rpm governor, must be used.

In order to explain the function, FIG. 2 shows a distributor fuel injection pump of a simplified type, in longitudinal section. In a housing 1, a pump piston 3 is made to reciprocate and simultaneously rotate in a cylinder bore 2, counter to the force of a restoring spring 4, by means of a cam drive 5. The pump work chamber 6 of this pump is supplied with fuel from a suction chamber 9 which is under negative pressure via longitudinal grooves 7 disposed in the jacket face of the pump piston 3 and via a conduit 8 extending in the housing 1, as long as the pump piston 3 is executing a downward suction stroke or assumes its bottom dead center position. After the beginning of the compression stroke and as soon as the conduit 8 is closed, after a corresponding rotation of the pump piston 3, the fuel located in the pump work chamber 6 is pumped into a longitudinal conduit 10 extending in the pump piston. From this longitudinal conduit 10, the fuel is then delivered via a branching radial bore 11 and a longitudinal distributor groove 12, disposed in the surface of the pump piston, to one of a plurality of pressure lines 13, only one of which is shown. The actual number of pressure lines 13 corresponds to the number of engine cylinders to be supplied. The inlets of the pressure lines 13 are distributed about the cylinder bore 2, and one check valve 14 opening in the pumping direction is provided in each of the pressure lines.

The suction chamber 9 is supplied with fuel via a feed pump 16 from a fuel container, not shown, via a line 17. The feed pump 16 is driven directly by the drive shaft 18 of the injection pump at an rpm that is proportional to the engine rpm and is embodied as a volumetric pump, so that the quantity supplied by the pump is in proportion to the drive rpm; that is, an increasing quantity is pumped with increasing rpm.

An annular slide 20 is axially displaceable about the pump piston 3, and by means of this annular slide 20 a radial bore 21 communicating with the longitudinal conduit 10 can be opened during the course of the compression stroke of the pump piston 3, subsequent to which the supply out of the pump work chamber 6 into one of the pressure lines 13 is interrupted, since the fuel can flow back into the suction chamber 9 via the radial bore 21, which terminates the injection.

The annular slide 20 is actuated via an intermediate lever 22, which is pivotable about a stationary shaft 23 and which at its other end, with a head 24, engages a recess 25 of the annular slide 20. The other end of the intermediate lever 22 is engaged by a centrifugal governor, and with an interposed leaf spring 27, which acts as an regulation spring this same end is engaged by a governor spring 29 via a starting governor lever 28. The governor spring 29 has its prestressing arbitrarily varied via an adjusting lever 30 to serve as a "load input".

The centrifugal governor 26 has an adjusting sleeve 32, which is axially displaceable on a shaft 33 integral with the housing and which with its upper end acts upon the intermediate lever 22. Acting upon this sleeve 32 in the axial direction are flyweights 34, which are supported in a cage 34 which is driven via a gear 36 by the drive shaft 18 in rotational synchronism. With increasing rpm the force of the flyweights 34 acting upon the sleeve 32 increases, so that the force of the adjusting sleeve 32 acting axially upon the intermediate lever 22 increases as well. Via the levers 22 and 28, this force counteracts that of the governor sleeve 29, into the prestressing of which the load has been input. The fuel injection quantity fixed by the axial position of the annular slide 20 is thus dependent upon both the rpm and the arbitrarily input spring prestressing (load).

The cam drive 5 has a cam disc 38 with end cams, which is joined in a rotationally fixed manner to the drive shaft 18 and thus is driven at an rpm synchronized with the engine rpm. The cams of the cam disc 38 cooperate with rollers 39 of a roller disc 40 such that upon the rotation of the cam disc and the rolling of the end cams on the rollers 39, the pump piston 3 executes the above-mentioned reciprocating movement.

The cam roller ring disc 40 is rotationally adjustably supported in the housing 1 and joined via an arm 41 with an injection adjusting piston 42, so that a displacement of the injection adjusting piston 42 effects a rotation of the cam roller ring 40, causing the relative position of the rollers 39 to the cams of the cam disc 38 to vary; this in turn causes a variation of the supply onset, or beginning of the compression stroke, of the pump piston 3 with respect to the rotational position of the drive shaft 18. The injection adjusting piston 42 is acted upon by the overpressure prevailing in the suction chamber 9, which is transmitted via a conduit 43 extending within the piston 42 to a chamber 44 located prior to the end face of the piston. Depending upon the magnitude of the pressure, the piston 42 is displaced to a varying extent counter to the force of a restoring spring 45, which causes a corresponding change in the onset of injection.

The control of the overpressure in the pump suction chamber 9 is effected on the one hand by means of a pressure control valve 47 and on the other by means of the adjusting sleeve 32 of the centrifugal governor 26. The pressure control valve 47 operates with a piston 48, which is displaceable counter to a restoring spring 49 by means of the fuel pumped by the feed pump 16 and thereby opens an outflow opening to a varying degree. From the outflow opening, a return conduit 50 leads to the intake line 17 of the feed pump 16. By means of the adjusting sleeve 32, this pressure in the suction chamber is controlled once again in accordance with load, in that beyond a predetermined axial length a relief conduit 52 is opened up by the adjusting sleeve 32; this relief conduit 52 likewise leads to the intake line 17 of the feed pump 16. This conduit is not opened until the governor sleeve 32 is substantially extended, that is, until a relatively high rpm has been attained, after which a relative reduction of pressure takes place in this suction chamber 9 in accordance with the rpm, by means of an outflow of fuel out of the suction chamber 9 into this relief conduit 52; does this have a corresponding effect on the onset of injection. By means of the reduction in the suction chamber pressure thus effected, a relative shift toward "late" is attained. By means of the adjusting lever 30, a predetermined set-point rpm or a predetermined load status is fed into the governor. In order to attain this predetermined set-point rpm, an rpm increase is established. With increasing rpm, the flyweights 34 displace the governor sleeve 32 toward to the load state predetermined by the control lever 30. On the one hand, the supply quantity is reduced within the scope of the normal regulating function of the rpm governor, and on the other the relief conduit 52 is opened, which causes the above-described pressure reduction in the suction chamber 9. As the load status varies, the adjusting sleeve 32 is displaced such that the relief conduit 52 is once again blocked, causing a corresponding increase in the suction chamber pressure. As a result, the instant of injection is readjusted in the "early" direction.

In order to attain the reduction in the full-load injection quantity mentioned at the outset above, the starting lever 28 cooperates with a full-load stop 54, which is pivotably supported on a shaft 55 and cooperates on the one hand with the three-dimensional contour 56 of an adjusting piston 57 and on the other with the free end of the starting lever 28, which is engaged by the governor spring 29. The pressure prevailing in the suction chamber 9 is extended, via a bore 58, into a chamber 59 into which the adjusting piston 57 plunges. The force exerted by the suction chamber pressure upon the adjusting piston 57 acts counter to a restoring spring 60. Depending on the level of the suction chamber pressure, the adjusting piston 57 assumes a different position, so that the stop of the lever 54 for the starting lever 28 varies in accordance with rpm. Since the suction chamber pressure also varies in accordance with load, a corresponding adjustment of the stop is effected in accordance with load.

Except for the subject of the hydraulic adjustment of the full-load stop, the fuel injection pump described has been mass produced for many years by Robert Bosch GmbH. In FIG. 3, the parts of this pump which relate to the invention are now shown in detail, augmented appropriately and on a larger scale.

The adjusting devices for the hydraulic full-load stop are accommodated in a housing section 62, which is flanged to the pump housing 1 such that it is open toward the suction chamber 9. The levers 22 and 28 of the rpm governor protrude into this housing section 62. The three-dimensional cam 56 on the adjusting piston 57 is tracked by a pin 63, which is supported in the housing section 62. Otherwise, the reference numerals correspond to those of FIG. 2. The stop position between the full-load stop 54 and the starting lever 28 is embodied as a switch 66, by means of which an electric line can be connected to a magnetic valve 64. This electric line extends partially via the full-load stop 54, the starting lever 28 and a wire 65. At the contact position of the switch 66, an appropriate insulation is provided, so that when the starting lever 28 touches the stop 54, a short circuit is effected. The magnetic valve 64 is disposed in a discharge line 67 from the chamber 44 of the injection adjuster, which leads to the pressure-relieved chamber 68 on the other side of the injection adjusting piston 42, in which the restoring spring 45 is disposed. A throttle 69 is provided in this discharge line 67 downstream of the magnetic valve 64. Alternatively, a throttle 70 may also be disposed in the discharge of the spring chamber 68, which is normally relieved of pressure.

The fuel injection pump according to the invention functions as follows:

As long as the switch 66 is closed, that is, as long as full-load operation prevails, the injection adjuster functions in the usual manner. The magnetic valve 64 is blocked, and the injection adjusting piston 42 assumes a position corresponding to the pressure in the suction chamber 9, which is adjusted toward "early" and adapted to the load as the rpm increases. If the switch 66 is interrupted by a sudden change of load from full load to partial load (the driver lets up on the gas pedal), the magnetic valve 64 switches into the switching position shown, so that fuel can flow out of the chamber 44 and the injection adjusting piston 42 is very rapidly displaced in the "late" direction. As a result, the injection onset is corrected correspondingly quickly when there are rapid load changes. Because of the throttle 69, this adjustment does not cause an undesirable abrupt change in the injection onset; this transition is controllable by adjusting the throttle cross-section. It should be noted that a damping throttle is always disposed in the conduit 43, and this damping throttle must be balanced with the throttle 69.

The alternative embodiment having the throttle 70 instead of the throttle 69 functions such that because of the ensuing throttle 70, a backup arises in the spring chamber 68 when the magnetic valve 64 opens, and this backup in turn causes an accelerated adjustment of the injection adjusting piston 42 in the "late" direction, or in other words toward the right in the drawing.

Then as soon as the switch 66 and hence the magnetic valve 64 are closed, the injection onset adjuster functions in the usual manner. During the period that the switch 66 is open, however, the injection onset adjuster operates substantially independently of the rpm, so that the actual adjustment depends solely on the load, which is fed into the system either by the engine or by the adjusting lever of the pump.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A fuel injection pump comprising a housing, a rotatable cam drive supported in said pump housing arranged to effect the pumping movement of a least one pump piston to vary the supply onset and thus the injection onset relative to its rotating portion by means of an adjusting piston acted upon counter to a restoring force by hydraulic pressures of a feed pump arranged to generate an rpm-dependent pressure, an rpm governor provided with a member adjustable in accordance with load and a correspondingly displaceable stop means cooperating with said member and defining the full-load quantity at a given time arranged to determine the injection quantity, said adjustable member arranged to move away from said stop means upon a load change in the direction of a decreasing load, and an electric switch associated with said stop arranged to trigger a magnetic valve which varies the pressures acting upon said adjusting piston thereby causing the injection onset to be shifted in the "late" direction.

2. A fuel injection pump as defined by claim 1, further wherein said stop means is hydraulically adjustable upon a change in load.

3. A fuel injection pump as defined by claim 1, further wherein said rpm governor has a control member variable in accordance with the hydraulic pressure upstream of said adjusting piston and further that this variable pressure determines the position of said stop means.

4. A fuel injection pump as defined by claim 2, further wherein said rpm governor has a control member variable in accordance with the hydraulic pressure upstream of said adjusting piston and further that this variable pressure determines the position of said stop means.

5. A fuel injection pump as defined by claim 3, further wherein said control member further comprises a sleeve of a centrifugal governor which is engaged on the one hand by the centrifugal force of flyweights and on the other by the load-dependent force of a spring which effects a pressure control.

6. A fuel injection pump as defined by claim 4, further wherein said control member further comprises a sleeve of a centrifugal governor which is engaged on the one hand by the centrifugal force of flyweights and on the other by the load-dependent force of a spring which effects a pressure control.

7. A fuel injection pump as defined by claim 1, further wherein said housing further includes a fuel suction chamber, said chamber further arranged to communicate with said adjusting piston, said stop means and a pump work chamber.

8. A fuel injection pump as defined by claim 1, further wherein said switch is embodied directly by said stop means and said quantity adjusting member.

9. A fuel injection pump as defined by claim 8, further wherein said quantity adjusting member further includes a starting lever, which actuates said quantity control member of said injection pump counter to the force of flyweights and wherein said force increases with rpm by a governor spring the prestressing of said governor spring being variable in accordance with load.

10. A fuel injection pump as defined by claim 1, further wherein said magnetic valve controls a throttled discharge of a work chamber disposed in proximity to a working face of said adjusting piston whereby opening of said magnetic valve creates a shift of said adjusting piston into a "late" direction.

11. A fuel injection pump as defined by claim 10, further wherein said discharge line communicates with a relief line of said work chamber which receives said working force of said adjusting piston and further that a throttle is disposed downstream of said discharge line whereby upon opening of said magnetic valve, a higher pressure is brought about in said work chamber.

* * * * *